(12) United States Patent
Kawai et al.

(10) Patent No.: US 8,854,511 B2
(45) Date of Patent: Oct. 7, 2014

(54) APPARATUS AND METHOD FOR IMAGE PROCESSING AND STORAGE MEDIUM, AND IMAGE PICKUP APPARATUS

(71) Applicant: FUJIFILM Corporation, Tokyo (JP)

(72) Inventors: Tomoyuki Kawai, Saitama (JP); Hidehiko Yamura, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/226,623

(22) Filed: Mar. 26, 2014

(65) Prior Publication Data

US 2014/0204248 A1    Jul. 24, 2014

Related U.S. Application Data

(63) Continuation of application No. PCT/JP2012/065836, filed on Jun. 21, 2012.

(30) Foreign Application Priority Data

Sep. 29, 2011  (JP) ................................. 2011-215056

(51) Int. Cl.
*H04N 9/64*     (2006.01)
*H04N 5/217*   (2011.01)

(52) U.S. Cl.
CPC ................................. *H04N 5/2176* (2013.01)
USPC ...................... 348/247; 348/222.1; 348/231.3

(58) Field of Classification Search
USPC ............................. 348/222.1, 231.3, 246, 247
See application file for complete search history.

(56) References Cited

U.S. PATENT DOCUMENTS

| 6,819,359 | B1 * | 11/2004 | Oda | 348/247 |
| 2008/0174683 | A1 | 7/2008 | Kiba et al. | |
| 2008/0278609 | A1 | 11/2008 | Otsuki | |
| 2008/0298716 | A1 * | 12/2008 | Yamagata | 382/275 |
| 2009/0175553 | A1 | 7/2009 | Utsugi | |

FOREIGN PATENT DOCUMENTS

| JP | 2000-308080 A | 11/2000 |
| JP | 2005-311732 A | 11/2005 |
| JP | 2008-34970 A | 2/2008 |
| JP | 2008-278394 A | 11/2008 |
| JP | 2009-177792 A | 8/2009 |

* cited by examiner

*Primary Examiner* — Gevell Selby
(74) *Attorney, Agent, or Firm* — Birch, Stewart, Kolasch & Birch, LLP

(57) ABSTRACT

An image processing method includes: acquiring a mosaic image photographed by image pickup means including an image pickup element in which a basic array pattern is repeatedly arranged in horizontal and vertical directions, storing first correction data containing a coordinate of a defective pixel and correction information associated with a position of the defective pixel in the basic array pattern, and second correction data containing a correction pattern corresponding to the correction information and indicating positions, relative to the defective pixel, of plural peripheral pixels that have a same color as the defective pixel, reading the correction pattern based on the correction information, calculating coordinates of the peripheral pixels based on the first correction data and the read correction pattern, extracting pixel values corresponding to the peripheral pixels at the calculated coordinates from the mosaic image, and calculating the pixel value of the defective pixel.

12 Claims, 18 Drawing Sheets

FIG.7

| CORRECTION INFORMATION n | CORRECTION PATTERN | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|
| | 00 | 01 | 02 | 03 | 04 | 10 | 11 | 12 | 13 | 14 | 20 | 21 | 22 | 23 | 24 | 30 | 31 | 32 | 33 | 34 | 40 | 41 | 42 | 43 | 44 |
| 0 | 0 | 0 | 0 | 0 | 0 | 0 | 1 | 1 | 0 | 0 | 0 | 1 | 0 | 0 | 0 | 0 | 0 | 0 | 1 | 0 | 0 | 0 | 0 | 0 | 0 |
| 1 | 0 | 1 | 0 | 1 | 0 | 0 | 0 | 0 | 0 | 0 | 0 | 0 | 0 | 0 | 1 | 0 | 0 | 0 | 0 | 0 | 0 | 0 | 1 | 0 | 0 |
| 2 | 0 | 0 | 0 | 0 | 0 | 1 | 0 | 1 | 1 | 0 | 0 | 0 | 0 | 1 | 0 | 0 | 1 | 0 | 0 | 0 | 0 | 0 | 0 | 0 | 0 |
| 3 | 0 | 0 | 0 | 0 | 0 | 0 | 0 | 0 | 1 | 0 | 0 | 0 | 0 | 0 | 0 | 1 | 0 | 0 | 0 | 0 | 0 | 0 | 0 | 0 | 0 |
| 4 | 0 | 0 | 0 | 0 | 0 | 0 | 1 | 0 | 0 | 1 | 1 | 0 | 0 | 0 | 0 | 0 | 1 | 1 | 1 | 1 | 0 | 0 | 0 | 0 | 0 |
| 5 | 0 | 0 | 0 | 0 | 0 | 0 | 0 | 0 | 1 | 0 | 0 | 1 | 0 | 0 | 0 | 0 | 0 | 0 | 0 | 0 | 0 | 0 | 0 | 0 | 0 |
| 6 | 0 | 0 | 0 | 0 | 0 | 0 | 0 | 0 | 0 | 0 | 1 | 0 | 0 | 0 | 0 | 0 | 0 | 1 | 1 | 0 | 0 | 1 | 0 | 1 | 0 |
| 7 | 0 | 0 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 8 | 0 | 0 | 0 | 0 | 0 | 0 | 1 | 0 | 0 | 0 | 0 | 0 | 0 | 1 | 0 | 0 | 0 | 1 | 1 | 0 | 0 | 0 | 0 | 0 | 0 |
| ... | | | | | | | | | | | | | | | | | | | | | | | | | |
| 125 | | | | | | | | | | | | | | | | | | | | | | | | | |
| 126 | | | | | | | | | | | | | | | | | | | | | | | | | |
| 127 | | | | | | | | | | | | | | | | | | | | | | | | | |

FIG.9

| CORRECTION INFORMATION n | CORRECTION PATTERN | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|
| | 00 | 01 | 02 | 03 | 04 | 10 | 11 | 12 | 13 | 14 | 20 | 21 | 22 | 23 | 24 | 30 | 31 | 32 | 33 | 34 | 40 | 41 | 42 | 43 | 44 |
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 1 | 0 | 2 | 0 | 2 | 0 | 0 | 4 | 0 | 0 | 0 | 0 | 2 | 0 | 0 | 0 | 0 | 0 | 0 | 0 | 0 | 0 | 0 | 4 | 0 | 0 |
| 2 | 0 | 0 | 0 | 0 | 0 | 0 | 0 | 2 | 4 | 0 | 0 | 0 | 0 | 2 | 0 | 0 | 6 | 0 | 0 | 0 | 0 | 0 | 0 | 0 | 0 |
| 3 | 0 | 0 | 0 | 0 | 0 | 2 | 0 | 0 | 0 | 0 | 0 | 0 | 0 | 0 | 4 | 2 | 0 | 0 | 0 | 0 | 0 | 0 | 0 | 0 | 0 |
| 4 | 0 | 0 | 0 | 0 | 0 | 0 | 0 | 0 | 1 | 2 | 4 | 0 | 0 | 0 | 0 | 0 | 1 | 0 | 1 | 2 | 0 | 0 | 0 | 0 | 0 |
| 5 | 0 | 0 | 0 | 0 | 0 | 0 | 0 | 0 | 0 | 0 | 0 | 2 | 0 | 0 | 0 | 0 | 4 | 2 | 0 | 0 | 0 | 0 | 0 | 0 | 0 |
| 6 | 0 | 0 | 0 | 0 | 0 | 0 | 6 | 0 | 6 | 0 | 0 | 0 | 0 | 2 | 0 | 0 | 0 | 0 | 0 | 0 | 0 | 2 | 0 | 2 | 0 |
| 7 | 0 | 0 | 4 | 0 | 0 | 0 | 0 | 0 | 0 | 0 | 0 | 0 | 0 | 0 | 0 | 0 | 0 | 0 | 4 | 0 | 0 | 0 | 0 | 0 | 0 |
| 8 | | | | | | | | | | | | | | | | | | | | | | | | | |
| ... | | | | | | | | | | | | | | | | | | | | | | | | | |
| 125 | | | | | | | | | | | | | | | | | | | | | | | | | |
| 126 | | | | | | | | | | | | | | | | | | | | | | | | | |
| 127 | | | | | | | | | | | | | | | | | | | | | | | | | |

LONGITUDINAL PATTERN (SECOND CANDIDATE)

FIG.14B

LATERAL PATTERN (THIRD CANDIDATE)

DIAGONAL (NE) PATTERN (FOURTH CANDIDATE)

DIAGONAL (NW) PATTERN (FIFTH CANDIDATE)

FIG.18

|   | SECOND CANDIDATE | THIRD CANDIDATE | FOURTH CANDIDATE | FIFTH CANDIDATE |
|---|---|---|---|---|
| 0 | 20 | 30 | 40 | 50 |
| 1 | 21 | 31 | 41 | 51 |
| 2 | 22 | 32 | 42 | 52 |
| 3 | 23 | 33 | 43 | 53 |
| 4 | 24 | 34 | 44 | 54 |
| 5 | 25 | 35 | 45 | 55 |
| 6 | 26 | 36 | 46 | 56 |
| 7 | 27 | 37 | 47 | 57 |
| 8 | 28 | 38 | 48 | 58 |
| ⋮ |   |   |   |   |

FIG.19

APPARATUS AND METHOD FOR IMAGE PROCESSING AND STORAGE MEDIUM, AND IMAGE PICKUP APPARATUS

CROSS REFERENCE TO RELATED APPLICATIONS

This application is a Bypass Continuation of PCT International Application No. PCT/JP2012/065836 filed on Jun. 21, 2012, which claims priority under 35 U.S.C. §119(a) to Patent Application No. 2011-215056 filed in Japan on Sep. 29, 2011, all of which are hereby expressly incorporated by reference into the present application.

BACKGROUND OF THE INVENTION

1. Field of the Invention

The presently disclosed subject matter relates to an apparatus, method, program and storage medium for image processing, and an image pickup apparatus, particularly to a technique for correcting a defective pixel among the pixels of an image pickup element.

2. Description of the Related Art

It has been a known fact that, when a pixel in an image pickup element is faulty, a defect corresponding to the fault occurs in an image. As a technique to solve this, there is known a defect correction process (the so-called address-registration-type defect correction process) in which the position of the pixel fault in the image pickup element is previously recorded in an image pickup apparatus (a camera) as the coordinates of the defect, and an image processing unit in the image pickup apparatus replaces the pixel at the recorded coordinates with the values or average value of the peripheral pixels.

Japanese Patent Application Laid-Open No. 2005-311732 discloses an image correction method in which correction patterns indicating the presence or absence of a defect in the peripheral pixels of a defective pixel to be corrected (sixteen kinds of correction patterns indicating the arrangement of pixels useable for interpolation) are previously determined, and four-bit information (correction pattern numbers) for selecting a correction pattern is stored along with the address of the defective pixel. Thereby, it is possible to calculate the pixel value of the defective pixel using non-defective peripheral pixels, which are specified by the correction pattern corresponding to the correction pattern number that is stored along with the address of the defective pixel.

Japanese Patent Application Laid-Open No. 2000-308080 discloses a color image pickup element whose color filter array is an array other than the Bayer array, in particular, a random array.

The color filter array of this color image pickup element is a three-color random array of red (R), green (G) and blue (B) that meets a restrictive condition that any one of the four sides of a pixel of interest adjoins a pixel having the same color as the pixel of interest. Thereby, it is possible to prevent an occurrence of a color moire, even if an object whose luminance varies periodically. Furthermore, it is possible to substantially block a resolution deterioration caused by the presence of an isolative pixel fault.

SUMMARY OF THE INVENTION

The image correction method described in Japanese Patent Application Laid-Open No. 2005-311732 is applied to an image pickup element whose color filter array is the Bayer array. In the case of the Bayer array, the positional relation of peripheral pixels useable for a defect correction is fixed depending on the color (G, or R/B) of the defective pixel. Therefore, the image correction method described in Japanese Patent Application Laid-Open No. 2005-311732 can not be applied to an image pickup element with a complicate color filter array, specifically, an image pickup element in which the positional relation between a defective pixel and pixels that are in the periphery of the defective pixel and that have the same color as the defective pixel varies.

The color image pickup element described in Japanese Patent Application Laid-Open No. 2000-308080 has a color filter array that is a three-color random array. This color filter array needs to meet the restrictive condition that any one of the four sides of a pixel of interest adjoins a pixel having the same as the pixel of interest. When correcting a defective pixel, the pixel value of a same-color pixel adjoining any one of the four sides of the defective pixel is used as a complement (replacement), and an interpolation process can not be performed for estimating the pixel value using plural pixels.

An object of the presently disclosed subject matter, which has been made in view of such a circumstance, is to provide an apparatus, method, program and storage medium for image processing and an image pickup apparatus that have no restriction of a color filter array, that can correct a defective pixel of an image pickup element having a complicate color filter array, with minimal correction data, and that can adequately correct a defective pixel without changing the hardware for an image pickup element having a different color filter array.

To achieve the above object, an image processing apparatus according to a first aspect of the presently disclosed subject matter includes: an image acquisition unit configured to acquire a mosaic image that is photographed by an image pickup unit, the image pickup unit including an image pickup element having a predetermined basic array pattern repeatedly arranged in a horizontal direction and a vertical direction, the basic array pattern being composed of horizontally m×vertically n pixels (m, n: one is an integer of 2 or more, and another is an integer of 3 or more) and in which color filters including three primary colors are arrayed; a first storage unit configured to store first correction data containing a coordinate of a defective pixel in the image pickup element and correction information associated with a position of the defective pixel in the basic array pattern; a second storage unit configured to store second correction data containing a correction pattern for a correction process of the defective pixel, the correction pattern indicating positions of plural peripheral pixels relative to the defective pixel, each of the peripheral pixels having a same color as the defective pixel, the correction pattern corresponding to the correction information; and a defect correction processing unit configured to calculate a pixel value of each defective pixel by interpolating pixel values of the peripheral pixels having the same color, based on the first correction data and the second correction data respectively stored in the first storage unit and the second storage unit, the peripheral pixels being determined for the defective pixel, the defect correcting processing unit including: a unit configured to read the correction pattern from the second storage unit based on the correction information contained in the first correction data, and to calculate coordinates of the plural peripheral pixels having the same color and being used in the correction process of the defective pixel, based on the coordinate of the defective pixel contained in the first correction data and the read correction pattern; a unit configured to extract the pixel values corresponding to the calculated coordinates of the plural peripheral pixels, from the mosaic image; and a unit configured to calculate the pixel value of the defective pixel by interpolating the extracted pixel values corresponding to the coordinates of the plural peripheral pixels.

According to the first aspect of the presently disclosed subject matter, a defective pixel in a mosaic image (image pickup element) corresponding to the repetition of the basic array pattern of m×n (m, n: one is an integer of 2 or more, and another is an integer of 3 or more) pixels, is corrected by an interpolation using the peripheral pixels. As data corresponding to each defective pixel in the image pickup element, the first correction data that contain the coordinate of a defective pixel and correction information associated with the position of the defective pixel in the basic array pattern, and the second correction data that contain a correction pattern that indicates the positions of plural peripheral pixels having the same color and being used in a correction process of the defective pixel, relative to the defective pixel, and that corresponds to the correction information, are stored. The first correction data for each defective pixel include the coordinate of the defective pixel and the correction information, and the correction information is the information associated with the position of the defective pixel in the basic array pattern. On the other hand, the second correction data are common information to be used in the correction of all defective pixels. Thereby, it is possible to minimize the data volume of these first and second correction data. Then, based on these first and second correction data, the pixel value of each defective pixel is calculated by interpolating the pixel values of the same-color peripheral pixels determined for the defective pixel. Here, even if the size of the basic array pattern is large and the color filter array is complicated, the size of the first correction data does not vary. The first and second correction data are data that are not subject to the restriction of the color filter array.

In an image processing apparatus according to a further alternative aspect of the presently disclosed subject matter, it is preferable that the second storage unit store first candidate to n-th candidate correction patterns for the defective pixels at a same position in the basic array pattern, and the correction information contained in the first correction data stored in the first storage unit have correction information corresponding to each of the first candidate to n-th candidate correction patterns. In this aspect, the correction pattern (peripheral pixels) to be used for the interpolation of the defective pixel is not limited, and any one correction pattern of the first candidate to n-th candidate correction patterns is selected. Thereby, it is possible to perform the interpolation using the optimal correction pattern for the correction of the defective pixel.

An image processing apparatus according to a further alternative aspect of the presently disclosed subject matter includes a pattern analysis unit configured to analyze an object pattern in a vicinity of the defective pixel to be corrected, based on peripheral pixels of the defective pixel, and a correction pattern determination unit configured to determine any one correction pattern of the first candidate to n-th candidate correction patterns corresponding to the correction information, based on an analysis result of the object pattern by the pattern analysis unit, in which the defect correction processing unit calculates the pixel value of the defective pixel, based on the coordinate of the defective pixel contained in the first correction data and the determined correction pattern. In this aspect, by performing the pattern analysis of the peripheral pixels of the defective pixel to be corrected, any one correction pattern of the first candidate to n-th candidate correction patterns is determined, and the interpolation process is performed based on the determined correction pattern. Thereby, it is possible to perform the optimal interpolation process that does not leave a correction trace.

In an image processing apparatus according to a further alternative aspect of the presently disclosed subject matter, preferably, the pattern analysis unit analyze which direction of the horizontal direction, the vertical direction, an upper-right diagonal direction and a lower-right diagonal direction is a correlation direction of pixel values of pixels in the vicinity of the defective pixel, based on the peripheral pixels of the defective pixel to be corrected. Thereby, it is possible to perform the interpolation process using the peripheral pixels in the correlation direction of the pixel values or luminances of the pixels having the same color in the vicinity of the defective pixel to be corrected, and to perform the optimal interpolation process that does not leave a correction trace.

An image processing apparatus according to a further alternative aspect of the presently disclosed subject matter, preferably include a discerning unit configured to discern whether a defective pixel is present in peripheral pixels having the same color as the defective pixel to be corrected, and a correction pattern determination unit configured to determine one correction pattern of the first candidate to n-th candidate correction patterns corresponding to the correction information, based on a discerned result by the discerning unit, the one correction pattern not containing a defective pixel, in which the defect correction processing unit calculates the pixel value of the defective pixel, based on the coordinate of the defective pixel contained in the first correction data and the determined correction pattern. Thereby, as the peripheral pixels to be used in the interpolation process, it is possible to use peripheral pixels that do not contain a defective pixel.

In an image processing apparatus according to a further alternative aspect of the presently disclosed subject matter, it is preferable that the defect correction processing unit calculate the pixel value of the defective pixel by weight-averaging the pixel values of the peripheral pixels having the same color, and the correction pattern stored in the second storage unit contain weighting coefficients for calculating the pixel value of the defective pixel by the weight-averaging. Thereby, it is possible to adequately perform the interpolation, even if the peripheral pixels of the defective pixel to be corrected are asymmetrically arranged by the color filter array.

In an image processing apparatus according to a further alternative aspect of the presently disclosed subject matter, a sum total of the weighting coefficients is set so as to be a power of 2, and the defect correction processing unit performs a product-sum operation between the pixel values of the peripheral pixels having the same color and the weighting coefficients assigned to the respective peripheral pixels, a result of which is thereafter divided by the sum total of the weighting coefficients. In the division by the sum total of the weighting coefficients, the sum total is set so as to be a power of 2. Thereby, it is possible to perform the division, simply by a bit shift.

In an image processing apparatus according to a further alternative aspect of the presently disclosed subject matter, the first correction data stored in the first storage unit have four-byte data for each defective pixel, the correction information has a predetermined bit length, two bytes of the four bytes are assigned to X-coordinate data of the defective pixel and some bits of the correction information, and two other bytes of the four bytes are assigned to Y-coordinate data of the defective pixel and other bits of the correction information. Thereby, it is possible to lessen the first correction data for each defective pixel. Further, it is possible to apply the above defect correction process also to an image that has a large image size and has great X and Y coordinate data, and to a complicate basic array pattern that requires a lot of correction information.

In an image processing apparatus according to a further alternative aspect of the presently disclosed subject matter, it is preferable that, in the first storage unit and the second storage unit, each of the first correction data and the second correction data is rewritable. Thereby, it is possible to deal with any image pickup element, by rewriting the first correction data and the second correction data.

An image processing method according to a further alternative aspect of the presently disclosed subject matter includes: an image acquisition step of acquiring a mosaic image that is photographed by an image pickup unit, the image pickup unit including an image pickup element having a predetermined basic array pattern repeatedly arranged in a horizontal direction and a vertical direction, the basic array pattern being composed of horizontally m×vertically n pixels (m, n: one is an integer of 2 or more, and another is an integer of 3 or more) and in which color filters including three primary colors are arrayed; a step of causing a first storage unit to store first correction data containing a coordinate of a defective pixel in the image pickup element and correction information associated with a position of the defective pixel in the basic array pattern; a step of causing a second storage unit to store second correction data containing a correction pattern for a correction process of the defective pixel, the correction pattern indicating positions of plural peripheral pixels relative to the defective pixel, each of the peripheral pixels having a same color, the correction pattern corresponding to the correction information; and a defect correction processing step of calculating a pixel value of each defective pixel by interpolating pixel values of the peripheral pixels having the same color, based on the first correction data and the second correction data respectively stored in the first storage unit and the second storage unit, the peripheral pixels being determined for the defective pixel, the defect correction processing step including: a step of reading the correction pattern from the second storage unit based on the correction information contained in the first correction data, and calculating coordinates of the plural peripheral pixels having the same color and being used in the correction process of the defective pixel, based on the coordinate of the defective pixel contained in the first correction data and the read correction pattern; a step of extracting the pixel values corresponding to the calculated coordinates of the plural peripheral pixels, from the mosaic image; and a step of calculating the pixel value of the defective pixel by interpolating the extracted pixel values corresponding to the coordinates of the plural peripheral pixels.

An image processing program according to a further alternative aspect of the presently disclosed subject matter causes a computer to execute: an image acquisition function of acquiring a mosaic image that is photographed by an image pickup unit, the image pickup unit including an image pickup element having a predetermined basic array pattern repeatedly arranged in a horizontal direction and a vertical direction, the basic array pattern being composed of horizontally m×vertically n pixels (m, n: one is an integer of 2 or more, and another is an integer of 3 or more) and in which color filters including three primary colors are arrayed; a function of causing a first storage unit to store first correction data containing a coordinate of a defective pixel in the image pickup element and correction information associated with a position of the defective pixel in the basic array pattern; a function of causing a second storage unit to store second correction data containing a correction pattern for a correction process of the defective pixel, the correction pattern indicating positions of plural peripheral pixels relative to the defective pixel, each of the peripheral pixels having a same color, the correction pattern corresponding to the correction information; and a defect correction processing function of calculating a pixel value of each defective pixel by interpolating pixel values of the peripheral pixels having the same color, based on the first correction data and the second correction data respectively stored in the first storage unit and the second storage unit, the peripheral pixels being determined for the defective pixel, the defect correction processing function including: a function of reading the correction pattern from the second storage unit based on the correction information contained in the first correction data, and calculating coordinates of the plural peripheral pixels having the same color and being used in the correction process of the defective pixel, based on the coordinate of the defective pixel contained in the first correction data and the read correction pattern; a function of extracting the pixel values corresponding to the calculated coordinates of the plural peripheral pixels, from the mosaic image; and a function of calculating the pixel value of the defective pixel by interpolating the extracted pixel values corresponding to the coordinates of the plural peripheral pixels.

An image pickup apparatus according to a further alternative aspect of the presently disclosed subject matter includes: the image pickup unit including a photographing optical system, and an image pickup element on which an object image is formed through the photographing optical system; the image acquisition unit configured to acquire an image output from the image pickup unit; and any image processing apparatus described previously.

According to the presently disclosed subject matter, it is possible to properly correct a defective pixel in a mosaic image (an image pickup element) corresponding to repetition of a more complicate basic array pattern than the Bayer array, by the interpolation using peripheral pixels. The presently disclosed subject matter is not restricted to any particular color filter array and can be applied to various mosaic images. In addition, it is possible to minimize the information volume necessary for correction of a defective pixel.

BRIEF DESCRIPTION OF THE DRAWINGS

FIG. 7 is a diagram illustrating a first embodiment of a correction pattern table (second correction data) that represents a relation between the correction information n and correction patterns;

FIG. 9 is a diagram illustrating a correction pattern table that represents a relation between the correction information n and correction patterns, and that is applied to a second embodiment of the defect correction processing method;

FIG. 10 is a diagram illustrating a correction pattern table that represents a relation between the correction information n and correction patterns, and that is applied to a third embodiment of the defect correction processing method;

FIG. 14A is a diagram illustrating an example of a correction pattern corresponding to second candidate correction information;

FIG. 14B is a diagram illustrating an example of a correction pattern corresponding to third candidate correction information;

FIG. 18 is a diagram illustrating a table in which the correction information contained in the first correction data and the second candidate to fifth candidate correction information are associated and stored; and FIG. 19 is a diagram illustrating a color filter array according to a third embodiment that is arranged in an image pickup element.

DETAILED DESCRIPTION OF EXEMPLARY EMBODIMENTS

Hereinafter, preferable embodiments of an apparatus, method, program and storage medium for image processing and an image pickup apparatus according to the presently disclosed subject matter are described in detail, with reference to the accompanying drawings.

[Embodiments of Image Pickup Apparatus]

Figure 1:
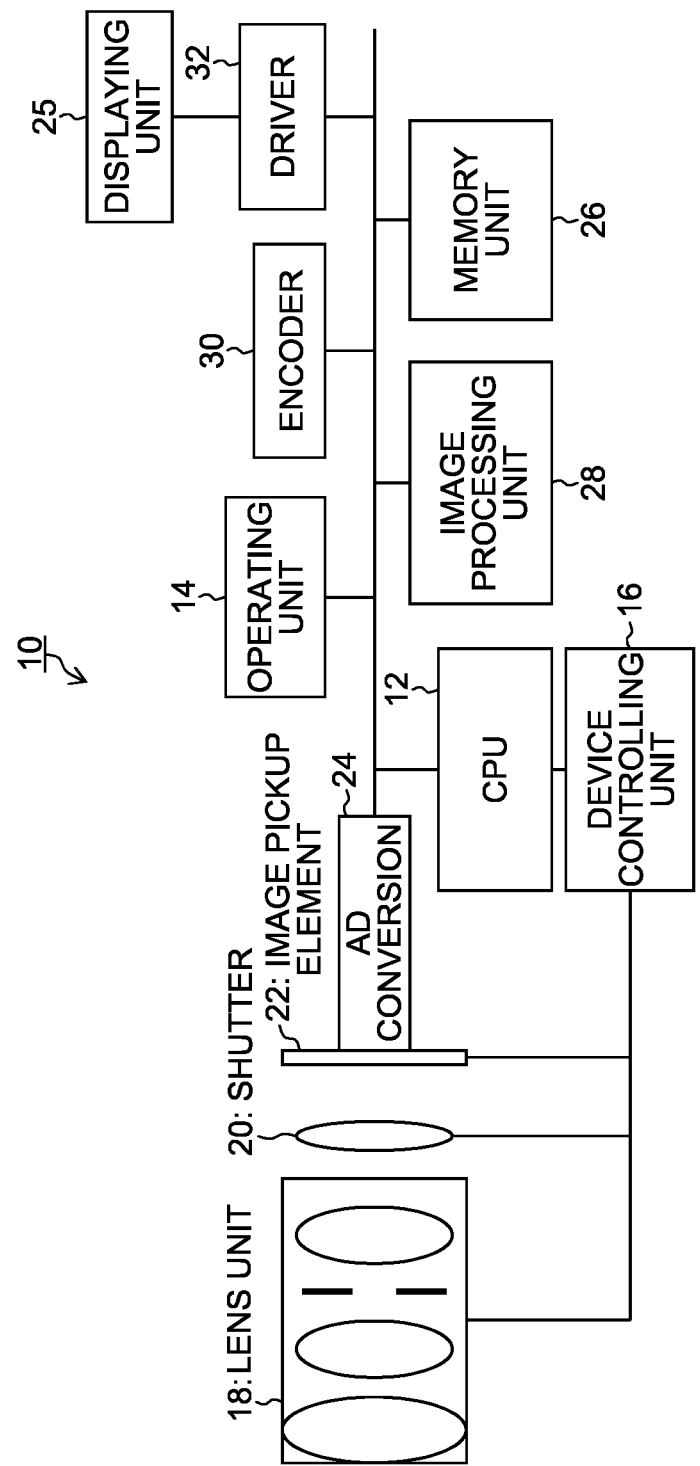
FIG. 1 is a block diagram illustrating an embodiment of an image pickup apparatus according to the presently disclosed subject matter.

FIG. 1 is a block diagram illustrating an embodiment of an image pickup apparatus according to the presently disclosed subject matter.

This image pickup apparatus 10 is a digital camera that stores a picked-up image in an internal memory (a memory unit 26) or an external storage medium (not illustrated in the figure). The whole operation of the image pickup apparatus 10 is controlled by a central processing unit (CPU) 12, in an integrated fashion.

The image pickup apparatus 10 is provided with an operating unit 14 that includes a shutter button, a mode dial, a playback button, a MENU/OK key, a cross key, a zoom button, a BACK key and the like. A signal from the operating unit 14 is input to the CPU 12, and based on the input signal, the CPU 12 controls each circuit of the image pickup apparatus 10. For example, the CPU 12 controls a lens unit 18, a shutter 20 and an image pickup element 22 through a device controlling unit 16, and performs a photographing operation control, an image processing control, an image-data recording/playback control, a display control for a displaying unit 25, and the like.

The lens unit 18 includes a focus lens, a zoom lens, an iris and the like. A luminous flux passing through the lens unit 18 and the shutter 20 forms an image on a light receiving surface of the image pickup element 22.

In the image pickup element 22, many light receiving elements (photodiodes) are arrayed in a two-dimensional manner. An object image formed on the light receiving surface of each photodiode is converted into a signal voltage (or an electric charge) having a quantity corresponding to the incident light quantity.

<First Embodiment of Image Pickup Element>

Figure 2:
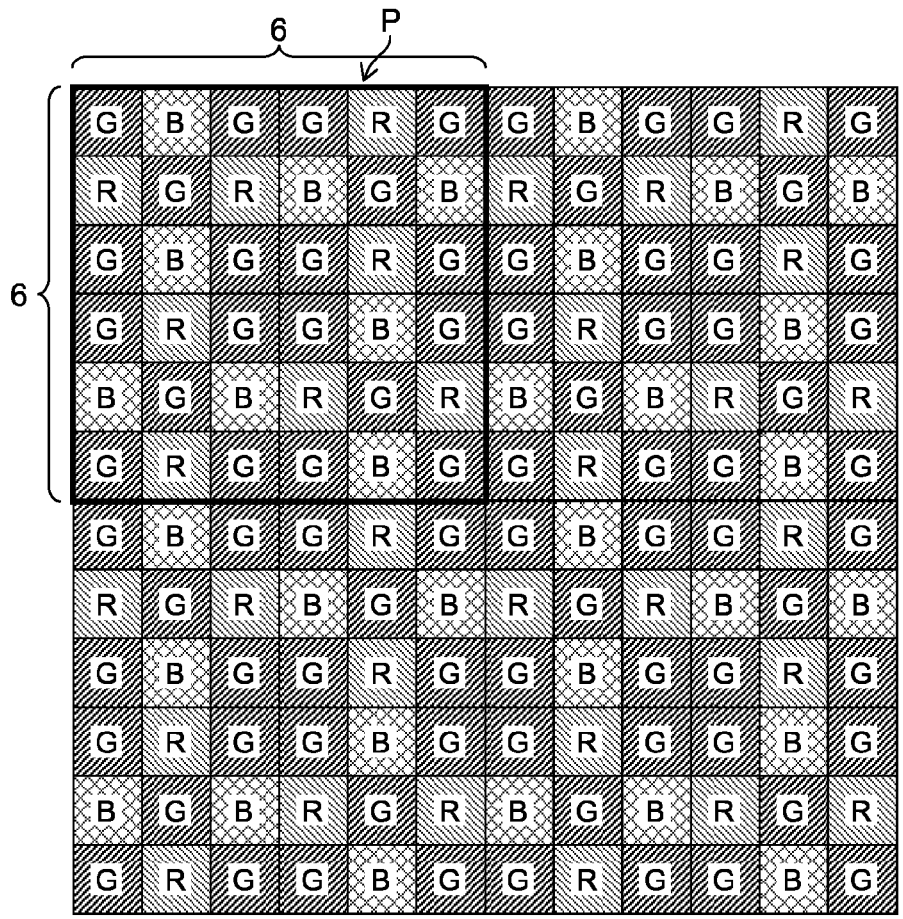
FIG. 2 is a diagram illustrating a novel mosaic color filter array arranged in the image pickup element.

FIG. 2 is a diagram illustrating a first embodiment of the above image pickup element 22, and particularly illustrates a novel color filter array that is arranged on the light receiving surface of the image pickup element 22.

The color filter array of this image pickup element 22 contains a basic array pattern P (the pattern illustrated by the thick-bordered frame) that is a square array pattern corresponding to 6×6 pixels. On the light receiving surface of the image pickup element 22, this basic array pattern P is repeatedly arranged in the horizontal direction and the vertical direction. That is, in this color filter array, filters (R filter, G filter and B filter) for the colors of red (R), green (G) and blue (B) are arrayed with a predetermined period. Thus, the R filter, the G filter and the B filter are arrayed with a predetermined period, and therefore, when performing the image process of RGB-based RAW data (mosaic image) read from the image pickup element 22, and the like, it is possible to perform the processes in accordance with the repetitive pattern.

In the color filter array illustrated in FIG. 2, the G filter, which corresponds to a color most contributing to obtaining a luminance signal (in this embodiment, G color), is arranged on each of the horizontal, vertical, upper-right diagonal and lower-right diagonal (NE, NW) lines of the color filter array.

As described above, the G filter corresponding to the luminance pixel is arranged on each of the horizontal, vertical, NE and NW lines of the color filter array. Thereby, it is possible to enhance the reproducibility of the synchronization process (the color interpolation process) (referred to as the demosaic process, also) in a high frequency region, regardless of which direction a high frequency occurs.

Furthermore, in the color filter array illustrated in FIG. 2, the R filter and the B filter, which correspond to two or more other colors (in this embodiment, R and B colors) besides the above G color, are arranged on each of the horizontal and vertical lines of the color filter array.

Since the R filter and the B filter are arranged on each of the horizontal and vertical lines of the color filter array, it is possible to suppress an occurrence of a color moire (false color).

Figure 3:
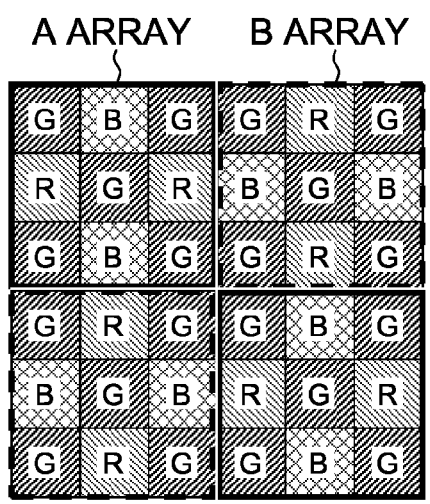
FIG. 3 is a diagram illustrating a state in which a basic array pattern illustrated in FIG. 2 is divided into four sets of 3×3 pixels.

FIG. 3 illustrates a state in which the basic array pattern P illustrated in FIG. 2 is divided into four sets of 3×3 pixels.

As illustrated in FIG. 3, in the basic array pattern P, the A array of 3×3 pixels enclosed by the solid-line frame and the B array of 3×3 pixels enclosed by the broken-line frame are alternately arranged in the horizontal and vertical directions.

In each of the A array and the B array, the G filters are arranged at the four corners and the center to be arranged on both diagonal lines. In the A array, across the G filter at the center, the R filters are arrayed in the horizontal direction, and the B filters are arrayed in the vertical direction. On the other hand, in the B array, across the G filter at the center, the B filters are arrayed in the horizontal direction, and the R filters are arrayed in the vertical direction. That is, in the A array and the B array, the positional relation between the R filters and the B filters is reversed, and the other arrangements are common.

Since the A array and the B array are alternately arranged in the horizontal and vertical directions, the G filters at four corners of the A arrays and B arrays constitute a G filter square array that corresponds to 2×2 pixels.

The signal electric charge accumulated in the image pickup element 22 having the above configuration is read as a voltage signal corresponding to the signal electric charge, based on a reading signal to be given from the device controlling unit 16. The voltage signal read from the image pickup element 22 is given to an A/D converter 24, and is sequentially converted into R, G and B digital signals corresponding to the color filter array by the A/D converter 24. The above R, G and B digital signals are saved in the memory unit 26.

The memory unit 26 includes an SDRAM (Synchronous Dynamic Random Access Memory) that is a volatile memory, an EEPROM (Electrically Erasable Programmable Read-Only Memory) that is a rewritable non-volatile memory, and the like. The SDRAM is used as a work area when the CPU 12 executes a program, and as a storage area for temporarily holding a digital image signal that has been picked up and acquired. On the other hand, in the EEPROM, for example, a camera controlling program including an image processing program according to the embodiment, the fault information of the pixels of the image pickup element 22, various parameters and tables to be used in the image process and the like, are stored.

An image processing unit 28 performs predetermined signal processes such as a defect correction process according to the embodiment, a white balance correction, a gamma correction process, a synchronization process and an YC process, for the digital image signal temporarily stored in the memory unit 26. The detail of the defect correction process for a faulty pixel (defective pixel) of the image pickup element 22 is described later.

The image data processed by the image processing unit 28 are encoded into image display data by an encoder 30, and through a driver 32, are output to the displaying unit 25 provided on the back face of the camera. Thereby, the object image is continually displayed on the image screen of the displaying unit 25.

By a first step depression (half press) of the shutter button of the operating unit 14, the CPU 12 starts an automatic focusing (AF) operation and an automatic exposure adjusting (AE) operation, and through the device controlling unit 16, moves the focus lens of the lens unit 18 in the optical direction to perform such a control that the focus lens comes to the focus position.

At the time of the half press of the shutter button, the CPU 12 calculates the brightness (photographic Ev value) of an object based on the image data output from the A/D converter 24, and determines an exposure condition (F value, shutter speed) from the photographic Ev value.

After the AE operation and the AF operation are completed, by a second step depression (full press) of the shutter button, the iris, the shutter 20 and the electric charge accumulation time in the image pickup element 22 are controlled based on the determined exposure condition, and an actual image-pickup is performed. The image data of an RGB mosaic image, which are read from the image pickup element 22 at the time of the actual image-pickup and are A/D-converted by the A/D converter 24, are temporarily stored in the memory unit 26.

The image data temporarily stored in the memory unit 26 are appropriately read by the image processing unit 28, and the predetermined signal processes including a defect correction process, a white balance correction, a gamma correction process, a synchronization process, an YC process and the like are performed. The YC-processed image data (YC data) are compressed in accordance with a predetermined compression format (for example, JPEG (Joint Photographic Experts Group) format). The compressed image data are stored in an internal memory or external memory, in a predetermined image file (for example, Exif (Exchangeable image file format) file) format.

[Defect Correction Process]

<First and Second Correction Data to be Used in Defective Pixel Correction>

Next, first and second correction data to be used in the defective pixel correction are described.

In the non-volatile memory (EEPROM) included in the memory unit 26, first correction data that consist of the coordinate data of a defective pixel and the correction information associated with the position of the defective pixel in the basic array pattern, are stored for each defective pixel of the image pickup element 22. Here, by evaluating the output data of the image pickup element 22 on a pixel basis before the factory shipment of the image pickup element 22 and discerning defective pixels, the first correction data are made for each defective pixel discerned as a defective pixel, and are recorded in the EEPROM.

Figure 4:
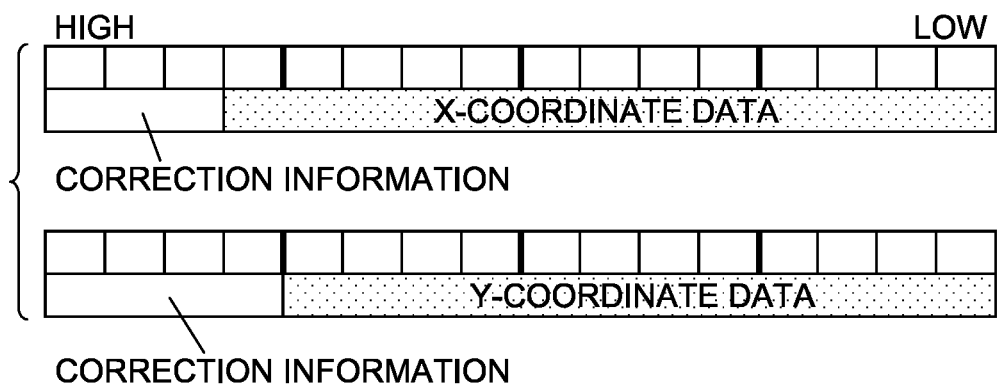
FIG. 4 is a diagram illustrating an example of the data structure of a first correction data.

As illustrated in FIG. 4, the first correction data have four-byte data for each defective pixel. As for two bytes of the four bytes, the low thirteen bits are assigned to the X-coordinate data of the defective pixel, and the high three bits are assigned to some of the correction information. As for the other two bytes of the four bytes, the low twelve bits are assigned to the Y-coordinate data of the defective pixel, and the high four bits are assigned to the remainder of the correction information.

Thereby, the X-coordinate data can be set in the range of 0 to 8191 that can be illustrated by thirteen bits, and the Y-coordinate data can be set in the range of 0 to 4095 that can be illustrated by twelve bits. The correction information, which is recorded while being divided into three bits and four bits, can have seven-bit (=128) information in total.

Next, the above correction information is described.

Figure 5:
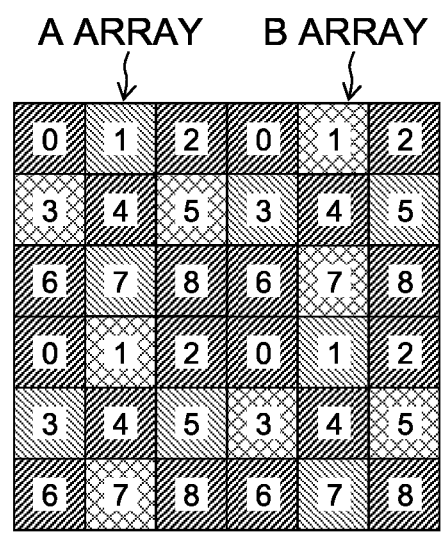
FIG. 5 is a diagram for explaining correction information contained in the first correction data.

The correction information is the information associated with the position of a defective pixel in a basic array pattern of an image pickup element, and, in the case of the basic array pattern of the image pickup element 22, can be illustrated by the numerals of 0 to 8, as illustrated in FIG. 5.

That is, the basic array pattern of the image pickup element 22 is a square array pattern of 6×6 pixels, as illustrated in FIG. 2, and has an array in which the A array and B array of 3×3 pixels are alternately arranged in the horizontal and vertical directions, as illustrated in FIG. 3. The A array and the B array have the same positions for the G pixels, and although the positional relation between the R pixels and the B pixels is reversed, the other arrangements are common.

In FIG. 5, the positions of the G pixels in the basic array pattern are illustrated by the numerals of 0, 2, 4, 6 and 8. When any one of 0, 2, 4, 6 and 8 is specified, the positional relation of the G pixels in the periphery of the specified G pixel can be also specified.

The positions of the R pixels and B pixels in the basic array pattern are illustrated by the numerals of 1, 3, 5 and 7. When any one of 1, 3, 5 and 7 is specified, the positional relation of the R pixels or B pixels in the periphery of the specified R pixel or B pixel can be also specified.

Thus, the above numerals 0 to 8 in the basic array pattern make it possible to specify the pixel position in the basic array pattern by the numerals. This results in the information (correction information) that makes it possible to specify the peripheral pixels having the same color as the specified pixel.

Figure 6:
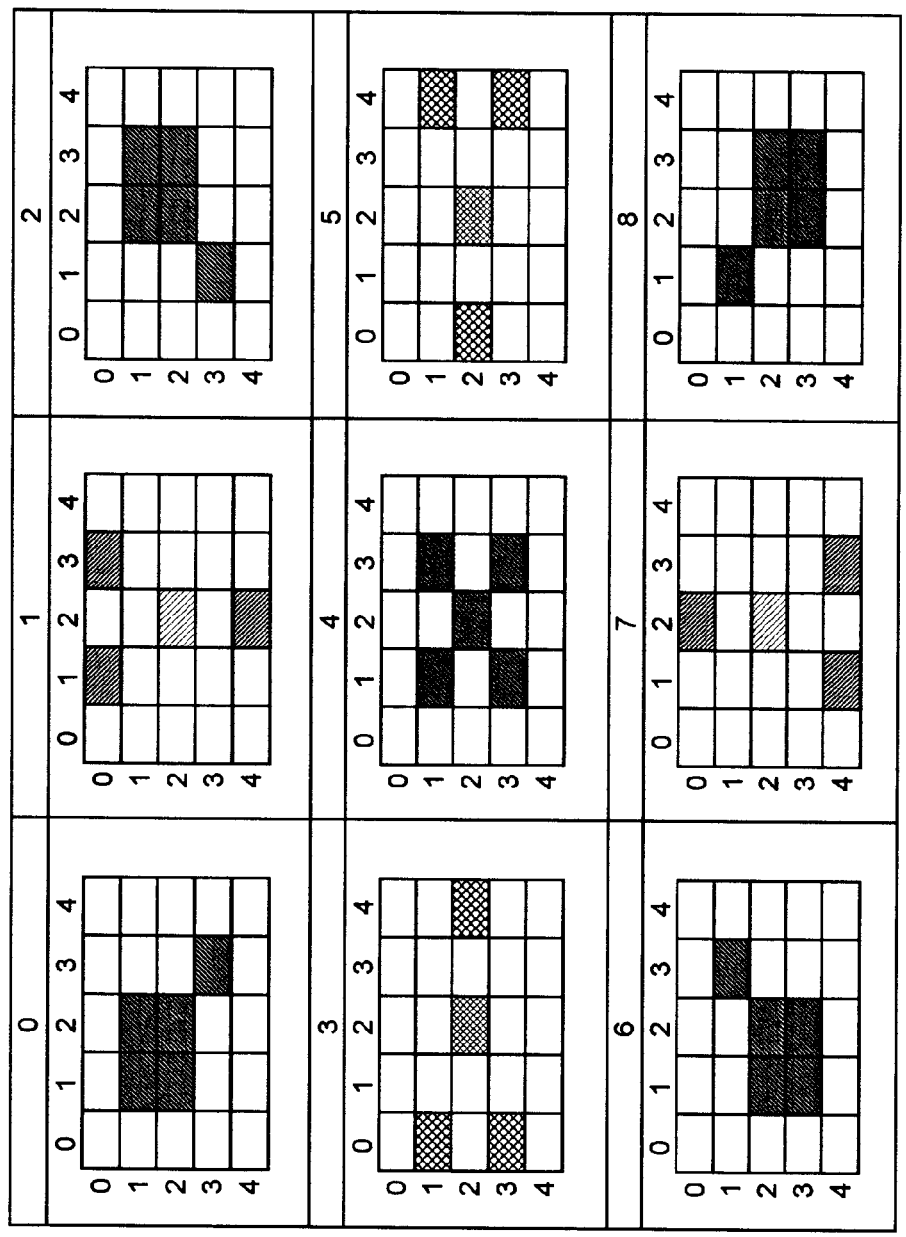
FIG. 6 is a diagram illustrating a positional relation between pixels corresponding to correction information n ($0 \leq n \leq 8$) illustrated in FIG. 5 and peripheral pixels to be used in correction of the pixels.

FIG. 6 is a diagram illustrating the positional relation between the pixels corresponding to the correction information n (0≤n≤8) illustrated in FIG. 5 and the peripheral pixels to be used in the correction of the pixels.

An example of FIG. 6, when the central pixel in an image size (region) of 5×5 pixels is a defective pixel to be corrected, illustrates the positional relation of the three pixels or four pixels that are pixels having the same color as the defective pixel and corresponding to the correction information n (0≤n≤8) illustrated in FIG. 5, and that are closest to the defective pixel in the region of 5×5 pixels.

When the positions in the region of 5×5 pixels are illustrated by (00), (01), (02), (03), (04), (10), . . . , (44), the position of the central pixel is (22).

For example, when the G pixel corresponding to the correction information 0 illustrated in FIG. 5 is a defective pixel, as illustrated by the correction information 0 in FIG. 6, the G pixels at the four positions of (11), (12), (21) and (33) are the four pixels that are closest to the position (22) of the central G pixels. When the pixel (the B pixel in the case of the A array, the R pixel in the case of the B array) corresponding to the correction information 1 illustrated in FIG. 5 is a defective pixel, as illustrated by the correction information 1 in FIG. 6, the pixels at the three positions of (01), (03) and (42) are the three same-color pixels that are closest to the position (22) of the central pixel. Thus, it is possible to specify the positional relation (the correction pattern on the basis of the position (22) of the defective pixel) of the same-color peripheral pixels to be used in the defect correction, depending on the correction information n (0≤n≤8).

FIG. 7 is a diagram illustrating a first embodiment of a correction pattern table (the second correction data) that represents the relation between the correction information n (0≤n≤127) and the correction patterns. In the correction pattern table, "1" is assigned to the pixels of 5×5 pixels in the periphery that are used in the correction, and "0" is assigned to the pixels that are not used in the correction.

As described previously, the correction information n in the embodiment is a seven-bit (0 to 127) numeral, and therefore, it is possible to specify 128 kinds of correction patterns. FIG. 7 illustrates 9 kinds of correction patterns of 0 to 8.

The correction pattern table illustrated in FIG. 7 is stored in the EEPROM of the memory unit 26, as the second correction data.

Here, the second correction data, which are determined depending on the basic array pattern of the image pickup element, are data independent of the position of the defective pixel in the image pickup element. The correction pattern illustrated in FIG. 6 and FIG. 7 is just one example, and, even when correcting a defective pixel at the same position, plural correction patterns are possible.

<First Embodiment of Defect Correction Processing Method>

Next, a first embodiment of a defect correction processing method of a defective pixel contained in a mosaic image, is described.

Figure 8:
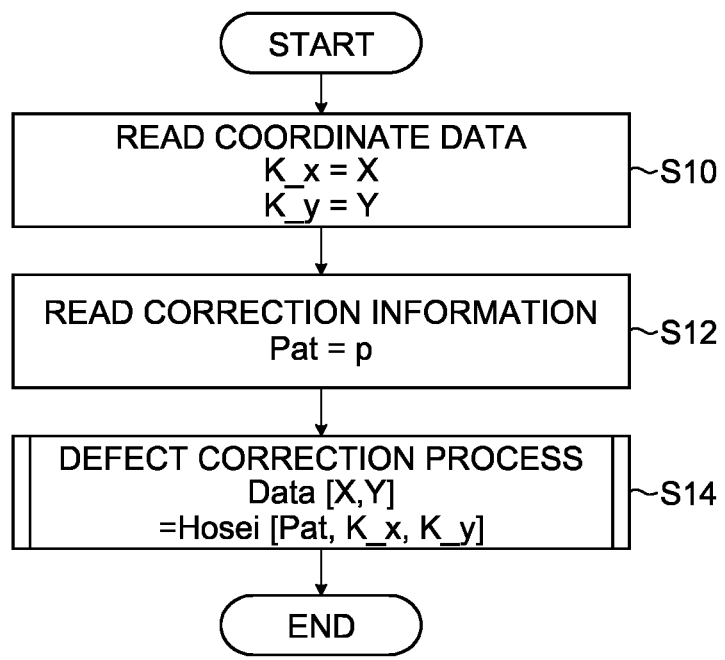
FIG. 8 is a flowchart illustrating a first embodiment of a defect correction processing method.

FIG. 8 is a flowchart illustrating the first embodiment of the defect correction processing method.

In FIG. 8, first, the first correction data that are stored in the memory unit 26 and that are stored corresponding to a certain defective pixel, are read. As described in FIG. 4, the first correction data are four-byte data. From this first correction data, the X-coordinate data X and Y-coordinate data Y of the defective pixel are read, and arguments K_x, K_y, which respectively represent the coordinates of the defective pixel, are set to be K_x=X and K_y=Y (step S10).

Subsequently, the correction information p is read from the above first correction data. That is, as described in FIG. 4, the seven-bit correction information p consisting of the high three bits of the two bytes that are of the four bytes and in which the X-coordinate data are stored and the high four bits of the two bytes in which the Y-coordinate data are stored, is read. Then, an argument Pat, which represents the correction pattern, is set to be Pat=p (step S12).

Next, the arguments K_x=X, K_y=Y, Pat=p set in steps S10 and S12 are passed to a function Hosei[Pat, K_x, K_y], and the pixel value Data[X, Y] of the defective pixel that is a defect correction process object is calculated (step S14).

That is, the function Hosei[Pat, K_x, K_y] specifies the coordinates of the defective pixel that is a correction object, by the arguments K_x=X, K_y=Y, and specifies the correction pattern by the argument Pat=p. Then, based on the coordinates of the defective pixel and the correction pattern, the coordinates of the plural same-color pixels that are the peripheral pixels to be used in the defect correction, are specified. The pixel values of these specified pixels are read, and an interpolation operation with the read pixel values is performed. Thereby, the pixel value Data[X, Y] is calculated.

The defect correction process in the above steps S10 to S14 is performed for all the defective pixels that are previously registered in the memory unit 26.

<Second Embodiment of Defect Correction Processing Method>

In accordance with the correction patterns illustrated in FIG. 7, the plural peripheral pixels to be used in the correction are selected, and by the arithmetic average of the pixel values of these pixels, the pixel value of the defective pixel is calculated.

In a second embodiment of the defect correction processing method, the correction pattern table (the second correction data) is improved, and the weight-averaging is performed such that the centroid of the pixels to be calculated coincides with, or roughly coincides with the position of the defective pixel to be corrected.

FIG. 9 is a diagram illustrating a correction pattern table that represents the relation between the correction information n to be applied to the second embodiment of the defect correction processing method and the correction patterns.

In the correction patterns illustrated in FIG. 9, weighting coefficients are added for the peripheral pixels to be used in the correction of the defective pixel. The values of these weighting coefficients are set such that the centroid of the pixels to be weight-averaged based on these weighting coefficients coincides with, or roughly coincides with the position of the defective pixel to be corrected.

Even if the same-color peripheral pixels of the defective pixel to be corrected are asymmetrically arranged by the color filter array, it is possible to adequately interpolate the pixel value of the defective pixel, by performing the arithmetically-averaging with the weighting using the above correction pattern table.

<Third Embodiment of Defect Correction Processing Method>

Figure 10:
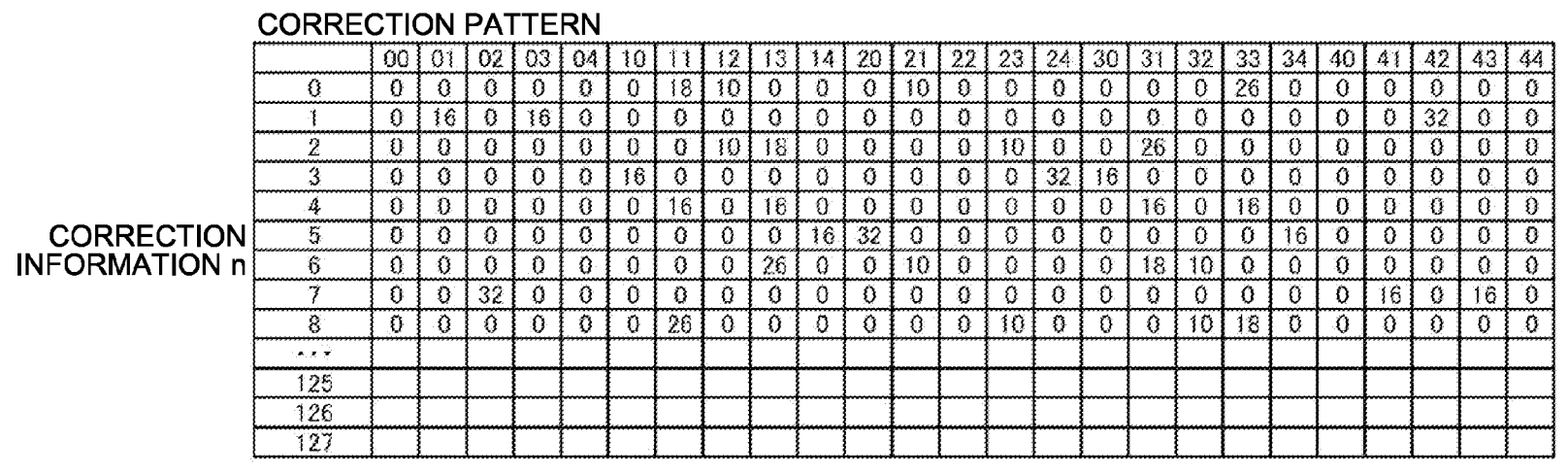

FIG. 10 is a diagram illustrating a third embodiment, and illustrates a correction pattern table (the second correction data) that represents the relation between the correction information n to be applied to the third embodiment of the defect correction processing method and the correction patterns.

Similarly to the embodiment illustrated in FIG. 9, in the correction patterns illustrated in FIG. 10, weighting coefficients are added for the peripheral pixels to be used in the correction of the defective pixel. Furthermore, in the embodiment, the weighting coefficients for each correction pattern are set such that the sum total is 64, which is a power of 2.

When calculating the pixel value of the defective pixel by weight-averaging the pixel values of the peripheral pixels, a product-sum operation between the pixel values of the peripheral pixels selected in accordance with the correction pattern and the weighting coefficients assigned to the respective peripheral pixels is performed, and thereafter, a division by the sum total of the weighting coefficients is performed. In the embodiment, since the sum total of the weighting coefficients is 64 (2 to the sixth power), it is possible to perform the division by the sum total of the weighting coefficients, by shifting the value after the product-sum operation to the low side by six bits. This simplifies a circuit for calculating the pixel value of the defective pixel.

Here, the sum total of weighting coefficients is not limited to 64, and only has to be a power of 2.

The correction pattern tables (the second correction data) illustrated in FIG. 7, FIG. 9 and FIG. 10 contain a lot of "0", and therefore, these tables may be recorded in the EEPROM as compressed data, and the compressed data may be decompressed when practically using the tables and may be held in a work area such as the SDRAM.

<Second Embodiment of Image Pickup Element>

Figures 11A, 11B:
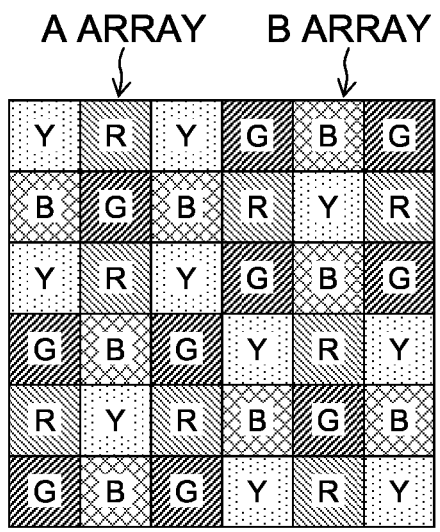
FIG. 11A is a diagram illustrating a color filter array according to a second embodiment that is arranged in an image pickup element.
FIG. 11B is a diagram illustrating the color filter array according to the second embodiment that is arranged in the image pickup element.

FIG. 11A, which is a diagram illustrating a second embodiment of the image pickup element, in particular illustrates a color filter array that is arranged on the light receiving surface of the image pickup element.

The color filter array of this image pickup element contains a basic array pattern that is a square array pattern corresponding to 6×6 pixels. This basic array pattern is repeatedly arranged on the above light receiving surface in the horizontal direction and the vertical direction.

The color filter array illustrated in FIG. 11A is an array in which the A array of 3×3 pixels and the B array of 3×3 pixels are alternately arranged in the horizontal and vertical directions.

In the A array, the G filter is arranged at the center, and yellow Y filters are arranged at the four corners. Across the G filter at the center, the B filters are arrayed in the horizontal direction, and the R filters are arrayed in the vertical direction. On the other hand, the B array has an arrangement in which the positions of the G and Y filters are reversed and the positions of the R and B filters are reversed, relative to the A array. In the B array, the Y filter is arranged at the center, and the G filters are arranged at the four corners. Across the Y filter at the center, the R filters are arrayed in the horizontal direction, and the B filters are arrayed in the vertical direction.

FIG. 11B illustrates the correction information n (0≤n≤8) associated with the position of the defective pixel in the above basic array pattern. As this correction information n, the same numerals as the basic array pattern according to the first embodiment illustrated in FIG. 5 are assigned.

Figure 12:
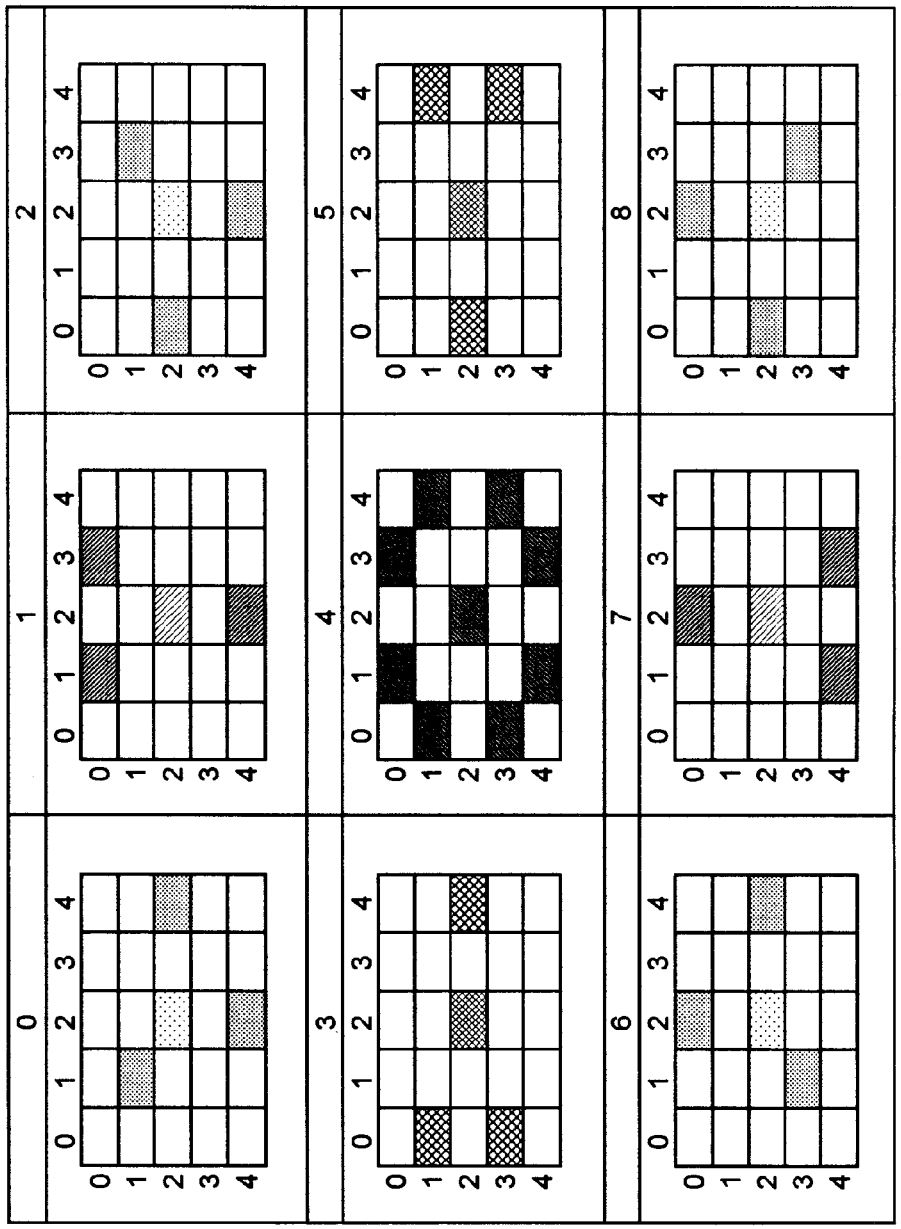
FIG. 12 is a diagram illustrating a positional relation between pixels corresponding to correction information n to be applied to the color filter array according to the second embodiment and peripheral pixels to be used in correction of the pixels.

FIG. 12 is a diagram illustrating the positional relation between the pixels corresponding to the correction information n (0≤n≤8) illustrated in FIG. 11B and the peripheral pixels to be used in the correction of the pixels.

Similarly to the image pickup element having the color filter array with three primary colors of R, G and B illustrated in FIG. 2 and FIG. 3, the image pickup element having the color filter array with four colors of R, G, B and Y illustrated in FIG. 11A and FIG. 11B makes it possible to configure the first and second correction data, and to perform the defect correction process according to each embodiment of the presently disclosed subject matter.

<Alternative Embodiment of First Correction Data>

Figure 13:
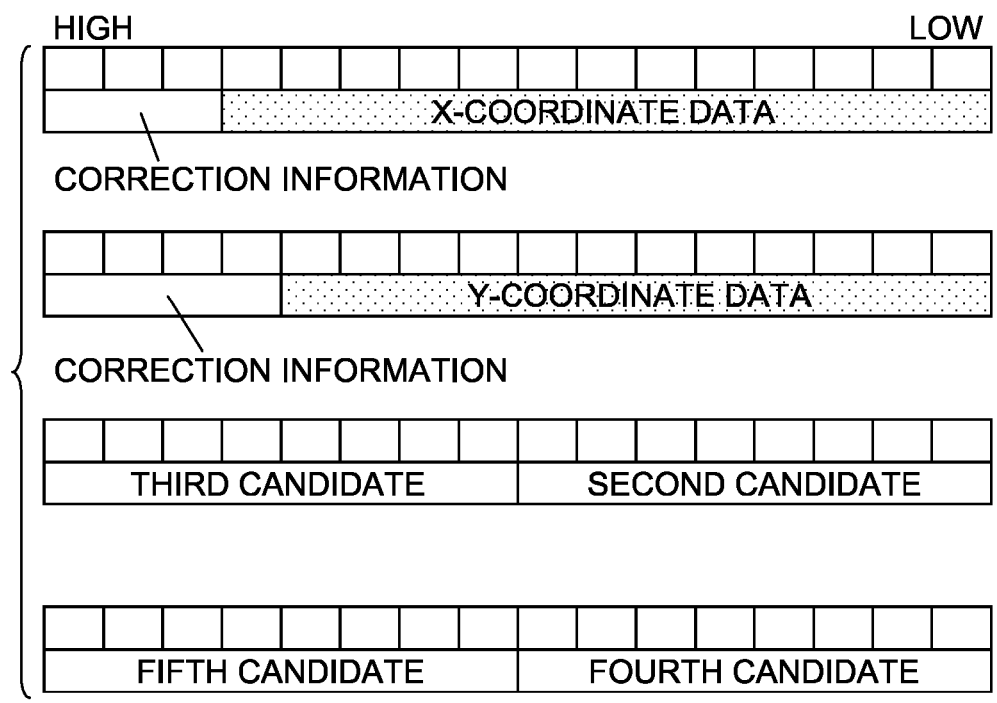
FIG. 13 is a diagram illustrating a data structure that illustrates an alternative embodiment of the first correction data to be used in correction of a defective pixel.

FIG. 13 is a diagram illustrating a data structure that illustrates an alternative embodiment of the first correction data to be used in the correction of the defective pixel.

As illustrated in FIG. 13, the first correction data have eight-byte data for each defective pixel. Four bytes of the eight bytes have the same data configuration as the first correction data illustrated in FIG. 4. The remaining four bytes can be assigned to second candidate to fifth candidate correction information, on a one-byte basis.

The above second candidate to fifth candidate correction information can be used as the information illustrating the correlation direction of the pixel values of pixels in the vicinity of the defective pixel, that is, as the information illustrating the vertical direction (longitudinal direction), the horizontal direction (lateral direction), the upper-right (NE) diagonal direction and the lower-right (NW) diagonal direction, respectively.

As for the correction pattern when the correction information (the first candidate) that are respectively recorded in the two bytes along with the X-coordinate data and the Y-coordinate data is 0, the correction patterns for the second candidate to fifth candidate correction information can be a longitudinal pattern, a lateral pattern, an NE diagonal pattern and an NW diagonal pattern illustrated in FIG. 14A to FIG. 14D.

These second candidate to fifth candidate correction patterns are stored in the EEPROM as the second correction data, along with the first candidate correction pattern. Then, when the defect correction process is performed, the optimal correction pattern of the above first candidate to fifth candidate correction patterns is selected, and the selected correction pattern is used.

<Fourth Embodiment of Defect Correction Processing Method>

Figure 15:
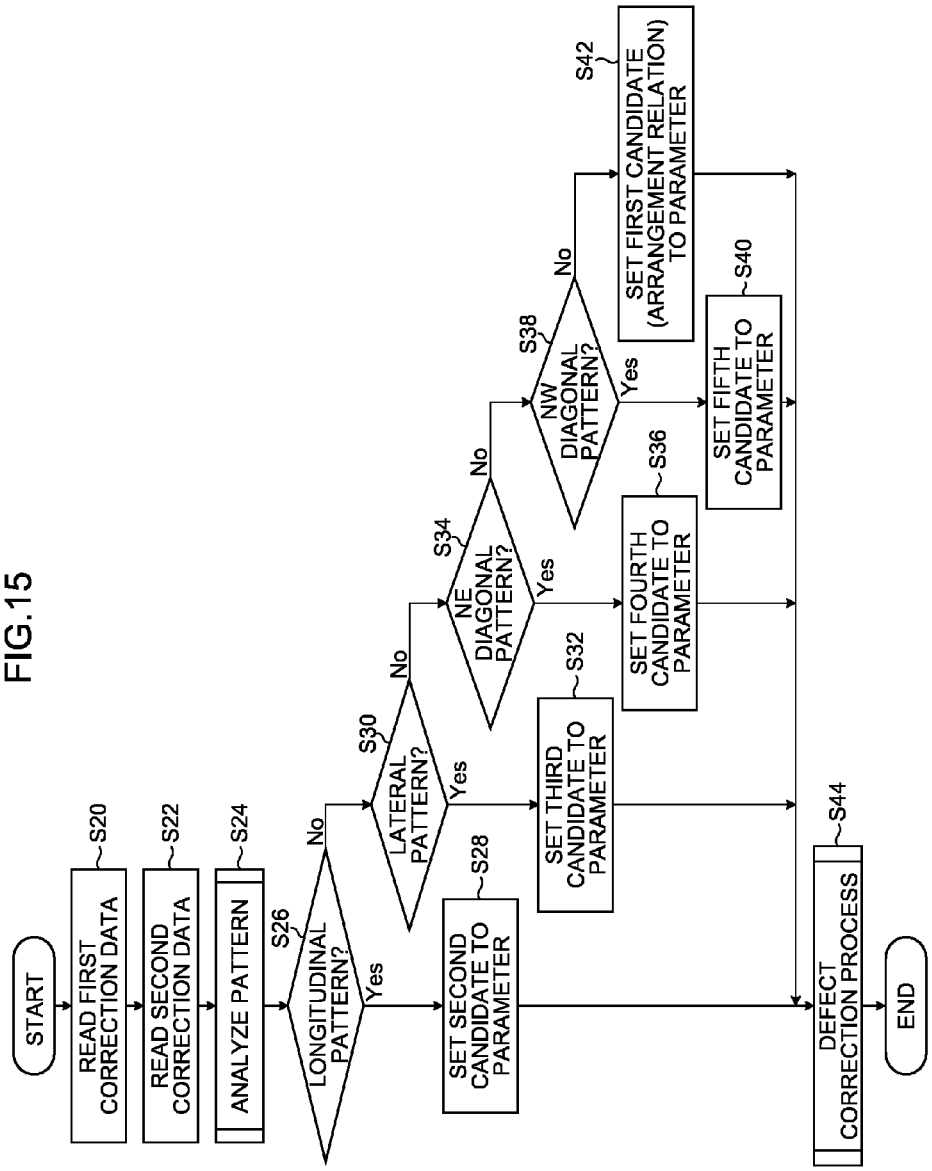
FIG. 15 is a flowchart illustrating a fourth embodiment of the pixel correction processing method.

FIG. 15 a flowchart illustrating a fourth embodiment of the defect correction processing method.

In FIG. 15, first, the first correction data that are stored corresponding to the defective pixel are read from the memory unit 26 (step S20). As illustrated in FIG. 13, the first correction data is eight-byte data, and the X-coordinate data, Y-coordinate data and first candidate to fifth candidate correction information of the defective pixel are read from the first correction data.

Subsequently, the second correction data (correction patterns) corresponding to the first candidate to fifth candidate correction information are read from the memory unit 26 (step S22).

Next, the object pattern in peripheral pixels of the read defective pixel is analyzed, and the correlation direction of the peripheral pixels having the same color as the defective pixel is detected (step S24).

Figure 14C:
FIG. 14C is a diagram illustrating an example of a correction pattern corresponding to fourth candidate correction information.
Figure 14D:
FIG. 14D is a diagram illustrating an example of a correction pattern corresponding to fifth candidate correction information.

That is, the pixels for detecting the correlation direction of the pixels having the same color are specified, based on the coordinate data of the defective pixel read in step S20 and the second candidate to fifth candidate correction patterns read in step S22. For example, as for the correction pattern when the correction information (the first candidate) is 0, if the position of the defective pixel is (0, 0) as illustrated in FIG. 14A, the pixel positions (−3, 0), (−1, 0), (2, 0) and (3, 0) are specified by the longitudinal pattern that is the second candidate, and then, from the correlation of the pixel values of these pixels, the correlation in the longitudinal direction is detected. Similarly, as illustrated in FIG. 14B to FIG. 14D, from the lateral pattern, NE diagonal pattern and NW diagonal pattern that are the third candidate to fifth candidate, the pixels for detecting the correlation in the respective directions are specified, and then the correlation is detected based on the pixel values of the specified pixels.

Then, in the case where the correlation direction detected by the pattern analysis in step S24 is the direction of the longitudinal pattern, the second candidate correction pattern is set (steps S26, S28). In the case of the direction of the lateral pattern, the third candidate correction pattern is set (steps S30, S32). In the case of the direction of the NE diagonal pattern, the fourth candidate correction pattern is set (steps S34, S36). In the case of the direction of the NW diagonal pattern, the fifth candidate correction pattern is set (steps S38, S40).

In the case of being unable to discern which direction of the above four directions exhibits a high correlation, the first candidate correction pattern is set (step S42).

In step S44, based on the X-coordinate data and Y-coordinate data of the defective pixel read in step S20 and the correction pattern set by one of steps S28, S32, S36, S40 and S42, the coordinates of the plural pixels that are the same-color peripheral pixels to be used in the defect correction are specified. Then, the pixel values of these pixels are read, and the interpolation operation with the read pixel values is performed. Thereby, the pixel value of the defective pixel is calculated.

The defect correction process in the above steps S20 to S44 is performed for all the defective pixels that are previously registered in the memory unit 26.

<Alternative Embodiment of Pattern Analysis>

Figure 16:
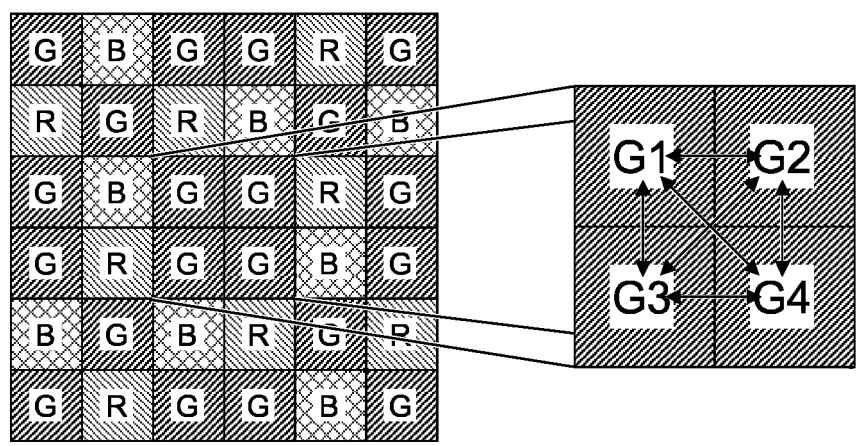
FIG. 16 is a diagram to be used for explaining a discerning method of a correlation direction in the vicinity of a defective pixel.

FIG. 16 is a diagram for explaining a discerning method of the correlation direction in the vicinity of the defective pixel.

As illustrated in FIG. 16, the G pixels of 2×2 pixels are picked out from a mosaic image in the vicinity of the defective pixel. Then, the pixel values of the G pixels are defined as G1, G2, G3 and G4 in the order from the upper left to the lower right, and in that case, the difference absolute values are calculated as a discerning method of the correlation direction.

That is, the difference absolute value in the longitudinal direction is (|G1−G3|+|G2−G4|)/2, the difference absolute value in the lateral direction is (|G1−G2|+|G3−G4|)/2, the difference absolute value in the NE diagonal direction is |G2−G3|, and the difference absolute value in the NW diagonal direction is |G1−G4|.

It is discerned that the correlation (correlation direction) is in the direction that has the minimal difference absolute value of these four difference absolute values, is made.

The correlation direction discerned in this way can be applied also when selecting a correction pattern in the high correlation direction from the first candidate to fifth candidate correction patterns for a defective pixel that is an R pixel or B pixel.

<Fifth Embodiment of Defect Correction Processing Method>

Figure 17:
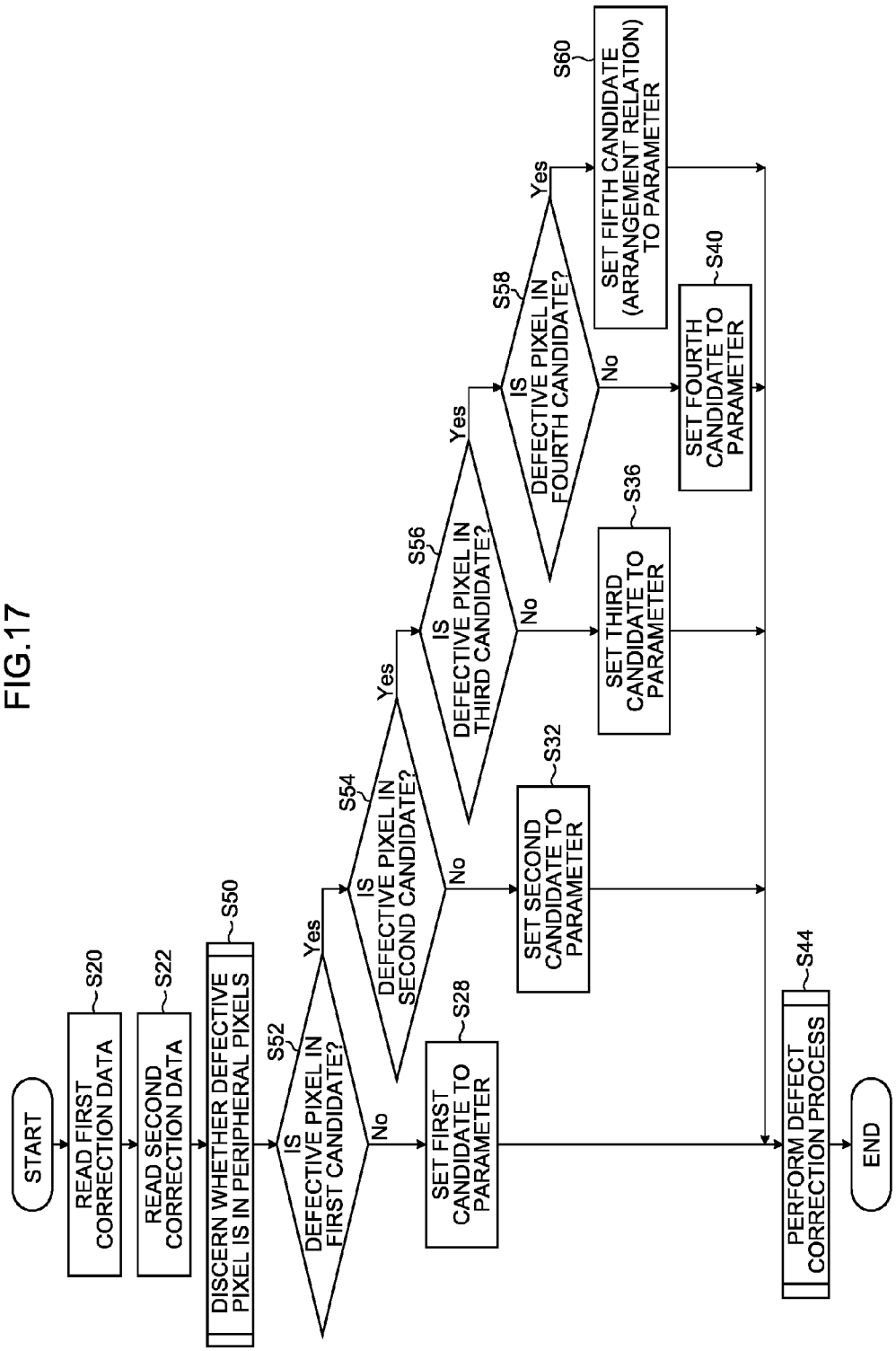
FIG. 17 is a flowchart illustrating a fifth embodiment of the defect correction processing method.

FIG. 17 is a flowchart illustrating a fifth embodiment of the defect correction processing method. Here, for common or similar steps to the fourth embodiment illustrated in FIG. 16, the same step numerals are assigned, and detailed descriptions therefor are omitted.

In FIG. 17, based on the coordinate data of the defective pixel read in step S20 and the first candidate to fifth candidate correction patterns read in step S22, in step S50, whether the pixels corresponding to the correction pattern contain a defective pixel is discerned for each of the first candidate to fifth candidate correction patterns. The coordinate data of the pixels to be used in the defect correction are derived based on the coordinate data of the defective pixel and the correction pattern, and then the discernment can be performed by whether the coordinate data coincide with the coordinate data of the registered defective pixel.

Then, based on the discerned result of the presence of a defective pixel in the pixels for each correction pattern in step S50, in the case where the first candidate correction pattern does not contain a defective pixel, the first candidate correction pattern is set (steps S52, S28). In the case where the second candidate correction pattern does not contain a defective pixel, the second candidate correction pattern is set (steps S54, S32). In the case where the third candidate correction pattern does not contain a defective pixel, the third candidate correction pattern is set (steps S56, S36). In the case where the fourth candidate correction pattern does not contain a defective pixel, the fourth candidate correction pattern is set (steps S58, S40).

In the case where all the above first candidate to fourth candidate correction patterns contain a defective pixel, the fifth candidate correction pattern is set (step S60). Here, an image pickup element containing many defective pixels is set aside as a defective product, and therefore, ordinarily, the fifth candidate correction pattern is not used. If the case where a defective pixel is contained for all the first candidate to fifth candidate correction patterns is added as a defective product condition, it is possible to perform the defect correction using one of the correction patterns.

In the above embodiment, as illustrated in FIG. 13, the second candidate to fifth candidate correction information are added to the first correction data, but the presently disclosed subject matter is not limited to this. For example, as illustrated in FIG. 4, the first correction data may have only one piece of correction information, and as illustrated in FIG. 18, the second candidate to fifth candidate correction information may be separately stored in connection with the correction information contained in the first correction data. This makes it possible to have plural candidates of the correction information without increasing the data volume of the first correction data.

[Additional Matter]

Figure 19:
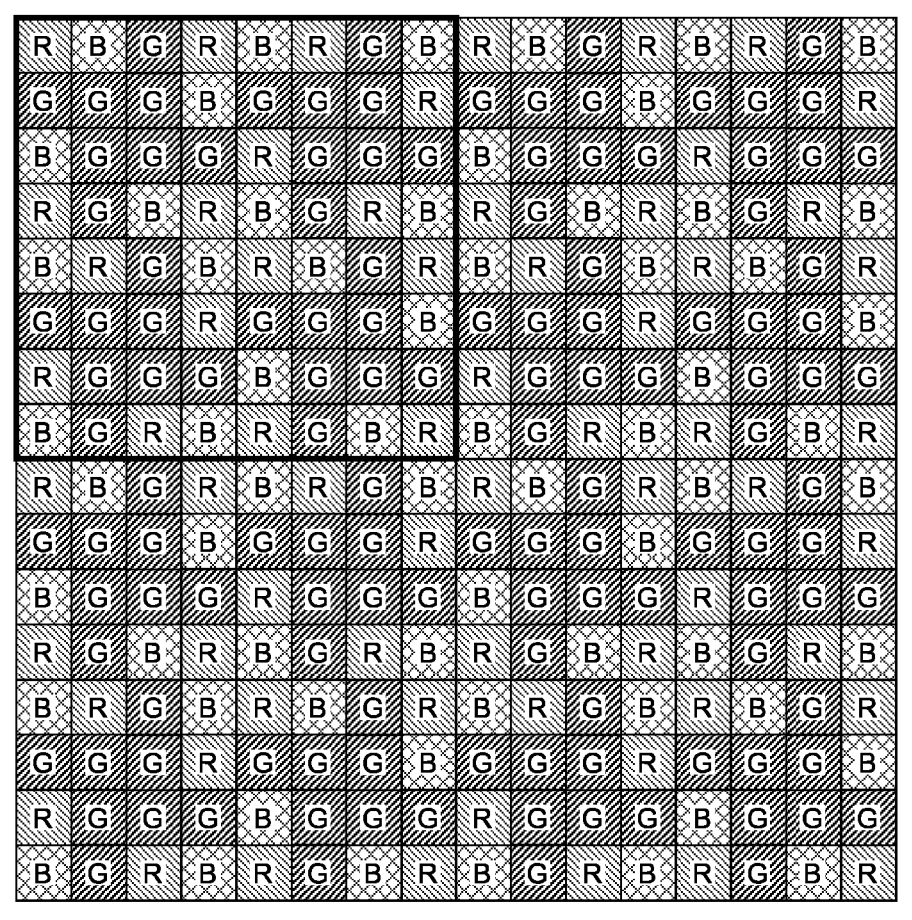

In the above embodiment, the case where the basic array pattern of the color filter array of the image pickup element has 6×6 pixels, has been described, but the presently disclosed subject matter is not limited to this. For example, can be applied to an image pickup element whose basic array pattern is the A array or B array of 3×3 pixels illustrated in FIG. 3. Also, the presently disclosed subject matter can be applied to an image pickup element in which the color filter array contains a basic array pattern corresponding to 8×8 pixels (the pattern illustrated by the thick-bordered frame) as illustrated in FIG. 19 and this basic array pattern is repeatedly arranged on the light receiving surface in the horizontal direction and the vertical direction. When the basic array pattern illustrated in FIG. 19 is divided into four sets of 4×4 pixels, the diagonal 4×4 pixels have the same array. As for the arrays of the 4×4 pixel sets adjoining in the horizontal direction or the vertical direction, the positional relation between the R filters and the B filters is reversed, but the other arrangements are common. Therefore, when 16 (=4×4) kinds of correction patterns are prepared, it is possible to perform the correction even if any pixel of the basic array pattern is faulty.

As the basic array pattern of the color filter array of the image pickup element, various patterns with a complicate color filter array are possible. For example, in a basic array pattern that includes horizontally m×vertically n pixels (m, n: one is an integer of 2 or more, and another is an integer of 3 or more) and in which color filters including three primary colors are arrayed, even if the respective color filters are randomly arranged, the presently disclosed subject matter can be applied. In this case, when m×n kinds of correction patterns are prepared, it is possible to perform the correction even if any pixel of the basic array pattern is faulty.

It is preferable in image processing that the basic array pattern of horizontally m×vertically n pixels be a square array pattern (m=n) that has the same period in the horizontal direction and in the vertical direction. In this case, m and n are integers of three or more. The basic array pattern of horizontally m×vertically n pixels (m, n: one is an integer of 2 or more, and the other is an integer of 3 or more) can have various sizes. Preferably, n and m should be ten or less, considering the ease of image processes such as a synchronization process (demosaic process) and a thinning process at the time of taking a video.

Furthermore, according to the presently disclosed subject matter, it is possible to adequately correct a defective pixel in an image pickup element having a different color filter array, simply by rewriting the first and second correction data stored in a non-volatile memory such as an EEPROM, without changing the hardware.

In the embodiment, the image pickup apparatus having the image processing apparatus that includes the defect correction process has been described. However, the image processes including the defect correction process may be performed by an external image processing apparatus. In this case, the image pickup apparatus may record a mosaic image (RAW data) to which the image processes including the defect correction process are not performed, and the external image processing apparatus may perform the defect correction process according to the presently disclosed subject matter, at the time of RAW-developing of the RAW data. In this case, it is necessary to pass the first correction data and second correction data to be used in the defect correction, to the external image processing apparatus. In addition, the image processing program (including the first correction data and the second correction data) including the defect correction process according to the presently disclosed subject matter may be embedded in the dedicated RAW-development software for the image pickup apparatus.

Needless to say, the presently disclosed subject matter is not limited to the above-described embodiments, and various modifications are possible in the range without departing from the spirit of the presently disclosed subject matter.

What is claimed is:

1. An image processing apparatus comprising:
   an image acquisition unit configured to acquire a mosaic image that is photographed by an image pickup unit, the image pickup unit including an image pickup element having a predetermined basic array pattern repeatedly arranged in a horizontal direction and a vertical direction, the basic array pattern being composed of horizontally m×vertically n pixels (m, n: one is an integer of 2 or more, and another is an integer of 3 or more) and including color filters of at least three colors arrayed therein;
   a first storage unit configured to store first correction data containing a coordinate of a defective pixel in the image pickup element and correction information associated with a position of the defective pixel in the basic array pattern;
   a second storage unit configured to store second correction data containing a correction pattern for a correction process of the defective pixel, the correction pattern indicating positions of plural peripheral pixels relative to the defective pixel, each of the peripheral pixels having a same color as the defective pixel, the correction pattern corresponding to the correction information; and
   a defect correction processing unit configured to calculate a pixel value of each defective pixel by interpolating pixel values of the peripheral pixels having the same color, based on the first correction data and the second correction data respectively stored in the first storage unit and the second storage unit, the peripheral pixels being determined for the defective pixel,
   wherein the defect correction processing unit comprises:
   a coordinate calculation unit configured to read the correction pattern from the second storage unit based on the correction information contained in the first correction data, and to calculate coordinates of the plural peripheral pixels having the same color and being used in the correction process of the defective pixel, based on the coordinate of the defective pixel contained in the first correction data and the read correction pattern;
   a pixel value extraction unit configured to extract the pixel values corresponding to the calculated coordinates of the plural peripheral pixels, from the mosaic image; and
   a pixel value calculation unit configured to calculate the pixel value of the defective pixel by interpolating the extracted pixel values corresponding to the coordinates of the plural peripheral pixels.

2. The image processing apparatus according to claim 1,
   wherein the second storage unit stores first to n-th candidate correction patterns, for the defective pixels at a same position in the basic array pattern, and
   the correction information contained in the first correction data stored in the first storage unit has correction information corresponding to each of the first candidate to n-th candidate correction patterns.

3. The image processing apparatus according to claim 2, further comprising:
   a pattern analysis unit configured to analyze an object pattern in a vicinity of the defective pixel to be corrected, based on peripheral pixels of the defective pixel; and
   a correction pattern determination unit configured to determine any one correction pattern of the first candidate to n-th candidate correction patterns corresponding to the correction information, based on an analysis result of the object pattern by the pattern analysis unit,
   wherein the defect correction processing unit calculates the pixel value of the defective pixel, based on the coordinate of the defective pixel contained in the first correction data and the determined correction pattern.

4. The image processing apparatus according to claim 3,
   wherein the pattern analysis unit analyzes which direction of the horizontal direction, the vertical direction, an upper-right diagonal direction and a lower-right diagonal direction is a correlation direction of pixel values of pixels in the vicinity of the defective pixel, based on the peripheral pixels of the defective pixel to be corrected.

5. The image processing apparatus according to claim 2, further comprising:
   a discerning unit configured to discern whether a defective pixel is present in peripheral pixels having the same color as the defective pixel to be corrected; and
   a correction pattern determination unit configured to determine one correction pattern of the first candidate to n-th candidate correction patterns corresponding to the correction information, based on a discerned result by the discerning unit, the one correction pattern not containing a defective pixel,
   wherein the defect correction processing unit calculates the pixel value of the defective pixel, based on the coordinate of the defective pixel contained in the first correction data and the determined correction pattern.

6. The image processing apparatus according to claim 1, wherein the defect correction processing unit calculates the pixel value of the defective pixel by weight-averaging the pixel values of the peripheral pixels having the same color, and
the correction pattern stored in the second storage unit contains weighting coefficients for calculating the pixel value of the defective pixel by the weight-averaging.

7. The image processing apparatus according to claim 6, wherein a sum total of the weighting coefficients is set so as to be a power of 2, and
the defect correction processing unit performs a product-sum operation between the pixel values of the peripheral pixels having the same color and the weighting coefficients assigned to the respective peripheral pixels, a result of which is thereafter divided by the sum total of the weighting coefficients.

8. The image processing apparatus according to claim 1, wherein the first correction data stored in the first storage unit have four-byte data for each defective pixel,
the correction information has a predetermined bit length,
two bytes of the four bytes are assigned to X-coordinate data of the defective pixel and some bits of the correction information, and
two other bytes of the four bytes are assigned to Y-coordinate data of the defective pixel and other bits of the correction information.

9. The image processing apparatus according to claim 1, wherein, in the first storage unit and the second storage unit, each of the first correction data and the second correction data is rewritable.

10. An image pickup apparatus comprising:
the image processing apparatus according to claim 1;
the image pickup unit including a photographing optical system, and an image pickup element on which an object image is formed through the photographing optical system; and
the image acquisition unit configured to acquire an image output from the image pickup unit.

11. An image processing method comprising:
an image acquisition step of acquiring a mosaic image that is photographed by an image pickup unit, the image pickup unit including an image pickup element having a predetermined basic array pattern repeatedly arranged in a horizontal direction and a vertical direction, the basic array pattern being composed of horizontally m×vertically n pixels (m, n: one is an integer of 2 or more, and another is an integer of 3 or more) and including color filters of at least three colors arrayed therein;
a step of causing a first storage unit to store first correction data containing a coordinate of a defective pixel in the image pickup element and correction information associated with a position of the defective pixel in the basic array pattern;
a step of causing a second storage unit to store second correction data containing a correction pattern for a correction process of the defective pixel, the correction pattern indicating positions of plural peripheral pixels relative to the defective pixel, each of the peripheral pixels having a same color as the defective pixel, the correction pattern corresponding to the correction information; and
a defect correction processing step of calculating a pixel value of each defective pixel by interpolating pixel values of the peripheral pixels having the same color, based on the first correction data and the second correction data respectively stored in the first storage unit and the second storage unit, the peripheral pixels being determined for the defective pixel,
wherein the defect correction processing step comprises:
a coordinate calculation step of reading the correction pattern from the second storage unit based on the correction information contained in the first correction data, and calculating coordinates of the plural peripheral pixels having the same color and being used in the correction process of the defective pixel, based on the coordinate of the defective pixel contained in the first correction data and the read correction pattern;
a pixel value extraction step of extracting the pixel values corresponding to the calculated coordinates of the plural peripheral pixels, from the mosaic image; and
a pixel value calculation step of calculating the pixel value of the defective pixel by interpolating the extracted pixel values corresponding to the coordinates of the plural peripheral pixels.

12. A non-transitory computer-readable storage medium configured such that, when instructions stored in the storage medium are read and executed by a processor, the processor executes:
an image acquisition step of acquiring a mosaic image that is photographed by an image pickup unit, the image pickup unit including an image pickup element having a predetermined basic array pattern repeatedly arranged in a horizontal direction and a vertical direction, the basic array pattern being composed of horizontally m×vertically n pixels (m, n: one is an integer of 2 or more, and another is an integer of 3 or more) and including color filters of at least three color types arrayed therein;
a step of causing a first storage unit to store first correction data containing a coordinate of a defective pixel in the image pickup element and correction information associated with a position of the defective pixel in the basic array pattern;
a step of causing a second storage unit to store second correction data containing a correction pattern for a correction process of the defective pixel, the correction pattern indicating positions of plural peripheral pixels relative to the defective pixel, each of the peripheral pixels having a same color as the defective pixel, the correction pattern corresponding to the correction information; and
a defect correction processing step of calculating a pixel value of each defective pixel by interpolating pixel values of the peripheral pixels having the same color, based on the first correction data and the second correction data respectively stored in the first storage unit and the second storage unit, the peripheral pixels being determined for the defective pixel,
the defect correction processing step comprising:
a coordinate calculation step of reading the correction pattern from the second storage unit based on the correction information contained in the first correction data, and calculating coordinates of the plural peripheral pixels having the same color and being used in the correction process of the defective pixel, based on the coordinate of the defective pixel contained in the first correction data and the read correction pattern;
a pixel value extraction step of extracting the pixel values corresponding to the calculated coordinates of the plural peripheral pixels, from the mosaic image; and a pixel value calculation step of calculating the pixel value of the defective pixel by interpolating the extracted pixel values corresponding to the coordinates of the plural peripheral pixels.

* * * * *